(12) United States Patent
Kreuter (10) Patent No.: US 7,147,148 B2
(45) Date of Patent: Dec. 12, 2006

(54) REMOTE PERSONALIZATION AND ISSUANCE OF IDENTITY DOCUMENTS

(76) Inventor: Ruediger Guenter Kreuter, Heinrich-Delp-Str. 290, Darmstadt (DE) 64297

( * ) Notice: Subject to any disclaimer, the term of this patent is extended or adjusted under 35 U.S.C. 154(b) by 0 days.

(21) Appl. No.: 10/659,919

(22) Filed: Sep. 11, 2003
(Under 37 CFR 1.47)

(65) Prior Publication Data
US 2005/0006460 A1    Jan. 13, 2005

Related U.S. Application Data

(60) Provisional application No. 60/412,267, filed on Sep. 20, 2002.

(51) Int. Cl.
*G06K 5/00* (2006.01)
(52) U.S. Cl. ................ 235/380; 235/492
(58) Field of Classification Search ............ 235/380, 235/492, 379, 383, 382, 375, 487, 488; 283/17, 283/27, 30
See application file for complete search history.

(56) References Cited

U.S. PATENT DOCUMENTS

| | | | |
|---|---|---|---|
| 4,600,828 A | 7/1986 | Nogami et al. | |
| 4,641,239 A | 2/1987 | Takesako | |
| 4,818,854 A | 4/1989 | Davies et al. | |
| 4,965,438 A | 10/1990 | Murofushi | |
| 4,970,655 A | 11/1990 | Winn et al. | |
| 5,534,857 A * | 7/1996 | Laing et al. | ............ 340/5.74 |
| 5,557,679 A | 9/1996 | Julin et al. | |
| 5,637,845 A | 6/1997 | Kolls | |
| 5,696,908 A | 12/1997 | Muehlberger et al. | |
| 5,710,637 A | 1/1998 | Matsumoto | |
| 5,889,941 A | 3/1999 | Tushie et al. | |
| 6,014,748 A * | 1/2000 | Tushie et al. | ............ 713/200 |
| 6,196,459 B1 | 3/2001 | Goman et al. | |
| 6,202,155 B1 | 3/2001 | Tushie et al. | |
| 6,588,673 B1 * | 7/2003 | Chan et al. | ............ 235/492 |
| 6,778,837 B1 * | 8/2004 | Bade et al. | ............ 455/456.1 |
| 2002/0082885 A1 | 6/2002 | Pittroff | |

FOREIGN PATENT DOCUMENTS

| | | |
|---|---|---|
| EP | 0 999 528 A2 | 5/2000 |
| WO | WO 92/17856 | 10/1992 |
| WO | WO 95/14291 | 5/1995 |

* cited by examiner

*Primary Examiner*—Steven S. Paik
(74) *Attorney, Agent, or Firm*—Hamre, Schumann, Mueller & Larson, P.C.

(57) ABSTRACT

A system for personalizing and issuing identity documents such as national ID cards, drivers licenses and the like, and booklets such as passports and the like, at a location remote from a central issuing agency. The system permits remote personalization and issuance of documents under mobile conditions while ensuring the security and integrity of the issuance process. The system operates under local control by an operator, but requires authorization from a remote agency prior to any personalization procedures or document issuance.

21 Claims, 6 Drawing Sheets

FIG. 6 ated financial cards is disclosed in WO 92/17856. As described therein, financial cards that contain user specific information are issued at a remote, unattended location directly to the user at an ATM-like machine.

REMOTE PERSONALIZATION AND ISSUANCE OF IDENTITY DOCUMENTS

This application claims priority from provisional application Ser. No. 60/412,267, filed Sep. 20, 2002, and which is incorporated herein by reference.

FIELD OF THE INVENTION

This invention relates to the production and issuance of identity documents. In particular, this invention relates to table top units that are able to personalize and issue secure identity documents, including cards such as national ID cards, drivers licenses and the like, and booklets such as passports and the like.

BACKGROUND OF THE INVENTION

Personalization and issuance of identity documents, such as national ID cards, drivers licenses, passports and the like must be done in a highly secure manner in order to ensure the integrity and distribution of the issued identity documents. The security concerns surrounding the issuance of these types of identity documents includes the prevention of document forgeries and duplications, issuance of a document to a person other than for whom the document was created, and issuance to unauthorized persons such as criminals.

To ensure the integrity of identity documents, such documents have typically been personalized and issued by a central issuing agency or location, such as a local or federal governmental authority. These documents are often sent to the intended recipient through the mail. However, mail systems throughout the world often times cannot be sufficiently relied upon. In addition, documents can be stolen from the mail prior to reaching the intended recipients.

As an alternative to mail, the issuing agency may require the intended document recipient to appear personally at the issuing agency to personally retrieve the issued document. This can often times be inconvenient for the recipient who may be located far away from the site of the issuing agency. There are also instances when a person needs a replacement identity document such as when the previous identity document is lost, stolen and/or damaged. It can also be inconvenient for a person to go to the issuing agency to obtain a replacement.

De-centralized personalization and issuance of identity documents would resolve these problems and others. However, de-centralized personalization and issuance must be done in a manner to ensure the integrity and distribution of the issued identity document.

A previous attempt at de-centralized issuance of personalized financial cards is disclosed in WO 92/17856. As described therein, financial cards that contain user specific information are issued at a remote, unattended location directly to the user at an ATM-like machine.

There is, however, a continuing need for de-centralized personalization and issuance of identity documents.

SUMMARY OF THE INVENTION

The invention provides a system for personalizing and issuing identity documents such as national ID cards, drivers licenses and the like, and booklets such as passports and the like, at a location remote from a central issuing agency. The system permits remote personalization and issuance of documents under mobile conditions while ensuring the security and integrity of the issuance process. The system operates under local control by an operator, but requires authorization from a remote authority prior to any personalization procedures or document issuance.

The invention also provides table top personalization machines that are used in the system for personalizing documents. Each table top machine is designed to be readily portable to facilitate mobile operations. Preferably, a machine includes a single personalization unit to promote the mobility of the machines. The machines interface with a local PC under operator control, and each includes the capability of interfacing with a remote central agency from which authorization must be received prior to personalizing or issuing any document.

A series of procedures to help ensure the security of the personalization and issuance process are also provided. These procedures provide the remote agency with full control of the personalization and issuance process. The procedures include remote enabling of machine operation, operator authorization for every machine step, authorization of the data sought to be personalized onto the document, logging of the machine operations, and logging of the documents emitted from the machine.

For a better understanding of the invention, its advantages and objects obtained by its use, reference should be made to the drawings which form a further part hereof, and to the accompanying description, in which there is described a preferred embodiment of the invention.

DETAILED DESCRIPTION

Figure 1:
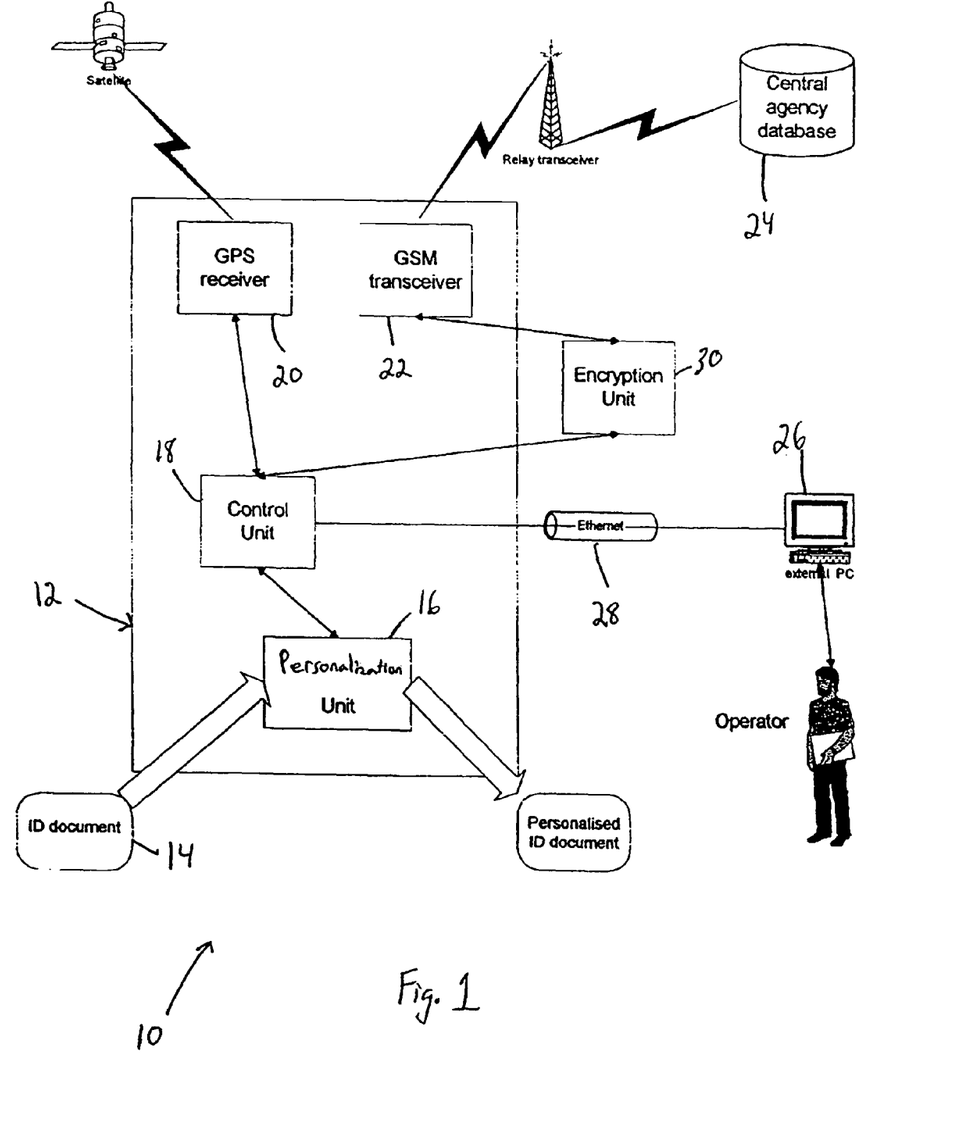
FIG. 1 illustrates the de-centralized document personalization and issuance system of the invention.

FIG. 1 illustrates a de-centralized document personalization and issuance system 10 according to the present invention. The system 10 includes a portable, table top personalization machine 12 which personalizes an identity document 14. Identity documents which can be personalized using the system of the invention includes cards such as national ID cards, drivers licenses and the like, and booklets such as passports and the like. Therefore, the terms "identity document" and "document" used herein are intended to include both cards and booklets.

The identity document 14 can be a document without any previous personalization, or a document with previous personalization whereby the machine 12 adds additional personalization to the document. Documents to be personalized are preferably input into the machine 12 one-by-one, and after personalization, are emitted from the machine. The documents can be fed into the machine by hand or by a suitable mechanized process which feeds the documents from a supply of documents, e.g. using an input hopper.

The table top machine 12 includes a personalization unit 16 which personalizes the document 14, a control unit 18 which controls operation of the machine 12, a Global Positioning System (GPS) receiver 20, and a Global System for Mobil Communications (GSM) transceiver 22. The type of personalization unit 16 that is used will depend upon the intended use of the table top machine. Preferably, a single personalization unit 16 is provided to promote the portability of the machine 12. However, it is contemplated that more than one personalization unit could be provided.

In one embodiment, the table top machine 12 is for personalizing plastic identification cards. In this case, the personalization unit 16 that is preferably used is a laser engraving unit that performs laser engraving on the plastic card 14. Laser engravers produce high resolution text and images on documents, which make the documents difficult to alter or forge. Photos, text, bar codes, fingerprints, microprinting, signatures and other graphic elements can be added to the identification card by the laser engraving unit. Laser engraving units for personalizing documents are well known in the art. In this type of machine 12, the plastic cards 14 to be personalized are preferably provided from an input hopper mechanism forming part of, or connected to, the table top machine 12. If desired, the machine 12 can also include an output stacker that stacks personalized cards.

In another embodiment, the table top machine 12 is for personalizing passports. In this case, the personalization unit 16 that is used is preferably a laser engraving unit that performs laser engraving on the passport 14. In this type of machine, a passport to be personalized is fed by hand into the machine 12. Photos, text, bar codes, fingerprints, microprinting, signatures and other graphic elements can be added to the passport by the laser engraving unit. A system for personalizing passports is disclosed in copending application Ser. No. 09/768,449, filed on Jan. 24, 2001, entitled "Passport Production System and Method".

In yet another embodiment, the personalization unit 16 in the machine 12 is preferably an ink-jet printer for personalizing documents that are compatible with ink-jet printing.

The machine 12 could also be provided with integrated circuit (IC) chip programming capability, either in place of the personalization units 16 mentioned above, or in addition to the above-described personalization units 16, in which case the machine 12 will include a plurality of personalization units. Many documents are now being provided with IC chips embedded therein to increase the amount of data that can be stored on the document. The IC chip programming unit which would perform programming operations on the IC chip can either be of the contact or contactless type, each of which is known in the art. The machine 12 can include other personalization capabilities as well, in addition to those described above.

In the preferred embodiment, the machine 12 is designed to permit personalization operations away from a central location under mobile conditions. Therefore, in the preferred embodiment, the machine 12 includes a single personalization unit 16 to promote the mobility of the machine. However, it is contemplated that the machine 12 could include additional personalization units as well while still permitting mobile operations.

The control unit 18 of the machine 12 controls operation of the personalization unit 16. The techniques for controlling a personalization unit to perform a desired personalization function are known in the art. In addition, the control unit 18 is connected to the GPS receiver 20 whereby the control unit 18 knows the exact location of the machine 12 at all times. The control unit 18 further communicates with a remote central agency 24 via the GSM transceiver 22, and with a local controller, such as a local PC 26, through a suitable interface, such as an ethernet connection 28. The central agency 24 can be a governmental authority that regulates the issuance of the documents 14, or some other authorized entity. Communications between the control unit 18 and the central agency 24 are encrypted using known encryption techniques, with an encryption unit 30 of the machine 12 encrypting communications sent from the control unit 18 to the central agency 24 and decrypting communications received from the central agency 24.

The system 10 operates as follows: a document 14 to be personalized is fed into the machine 12. The personalization unit 16 then performs a personalization process on the document under control of the control unit 18. For example, the personalization unit 16 can be a laser engraving unit that can laser engrave personal data or a picture of the document recipient onto the document. After personalization is complete, the document is discharged from the machine 12.

The GPS receiver 20 and GSM transceiver 22 permit mobile operations of the machine 12, thereby enabling de-centralized issuance of documents. Yet operation of the machine 12 must be such that the security and useability of the machine 12, and the resulting security of issued documents, is ensured. A series of procedures to help ensure the security of the operation of the machine 12 and the issuance of documents will now be described.

Remote Enabling of Machine Operation

As described above, the machine 12 permits mobile operations remote from the central agency 24. However, to increase security, the central agency is provided with full control to enable machine operations. Without enable authorization from the central agency, the machine 12 will not operate and personalization of documents is not possible, thereby preventing unauthorized usage of the machine 12.

Figure 2:
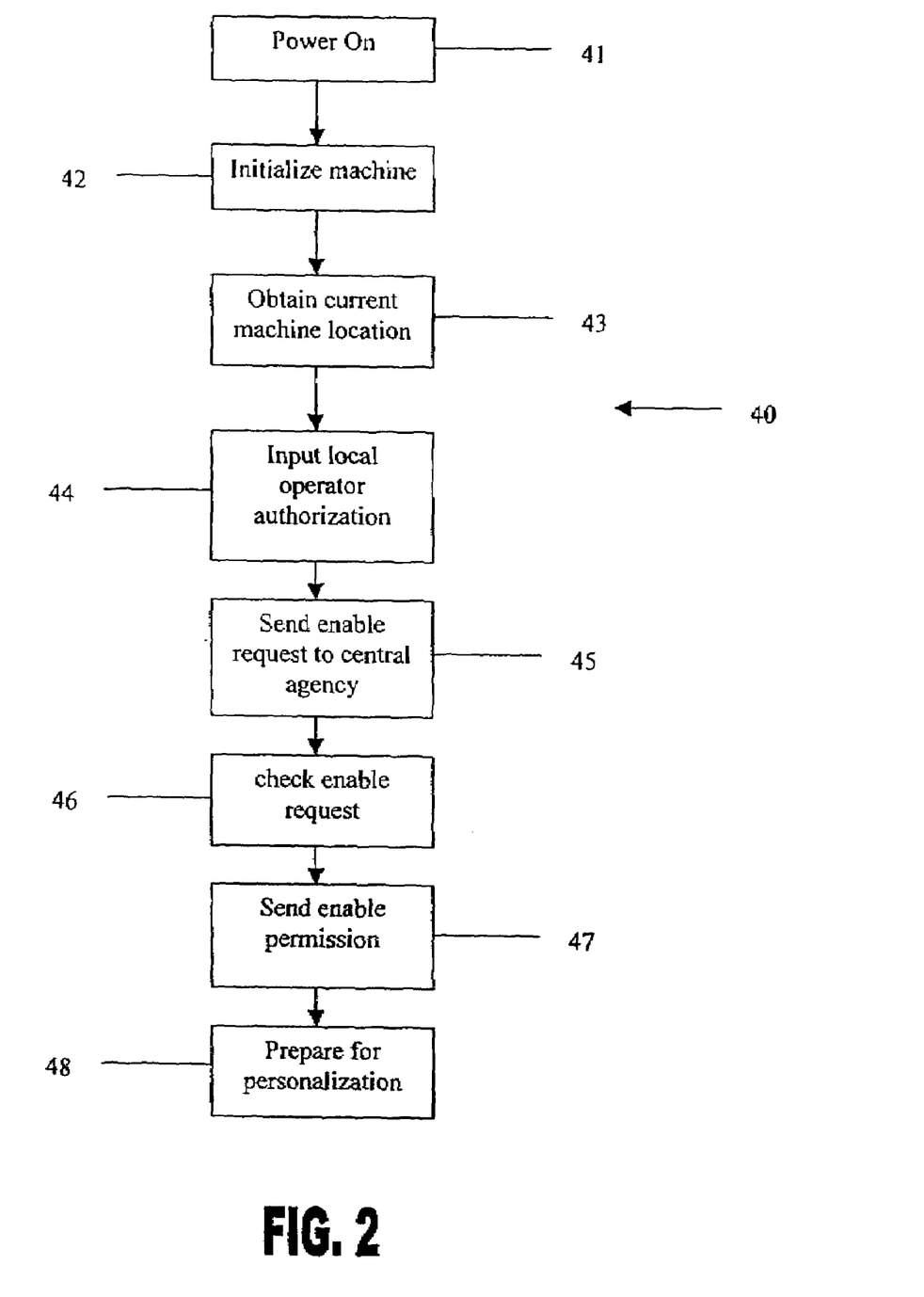
FIG. 2 is a block diagram of the remote enabling feature of the invention.

FIG. 2 illustrates the remote enabling process 40. At block 41, the power to the machine 12 is turned on, and thereafter the machine is initialized at block 42. The control unit 18 then obtains the current geographic location of the machine 12 from the GPS receiver 20 at block 43. Local operator authorization is then input at block 44 by an operator of the PC 26 entering a personal identification number via a keyboard or other PC interface device which is sent to the control unit 18. In addition, biometric data unique to the operator, such as a fingerprint, can be used to further increase security. A fingerprint can be obtained using a fingerprint sensor on the machine 12 or provided as part of the PC 26, with the fingerprint data being sent to the control unit 18. Other biometric data unique to the operator could be utilized as well. For example, an iris scanner can be used to scan the operator's iris and send the data to the control unit 18.

At block 45, the control unit 18 then sends an enable request to the central agency 24 via the GSM transceiver 22. The enable request includes the current geographic location of the machine obtained from the GPS receiver, the ID number of the operator, and a serial number unique to the machine 12. The biometric data, if obtained, can also be sent to the central agency 24 as part of the enable request. The control unit 18 then waits for enable permission from the central agency 24. Until permission is received, no further action is possible.

At block 46, the central agency 24 checks the information in the enable request against centrally stored data. A discrepancy between the information in the enable request and the centrally stored data could indicate that the machine 12 is not in its expected location, the operator is not the expected operator, and/or the machine is not the expected machine. Any one of these discrepancies may indicate a security breach or unauthorized use of the machine. If a discrepancy exists, the central agency does not send operation permission back to the machine 12 and the machine cannot operate. Provided that no discrepancy exists, the central agency 24 sends back an enable permission signal to the control unit 18 at block 47. The control unit 18 then prepares for a personalization operation at block 48.

Operator Authorization

The table top machine 12 works under local operator control during usual operation. Even after machine operations are enabled, there is a continuing need to control machine operation to prevent security lapses from occurring once enable permission is given. The system 10 is designed such that every single machine step that requires operator intervention needs authorization from the local operator and from the central agency, thereby preventing unauthorized personnel access to the machine. Absent these authorizations, no single machine action is possible.

Figure 3:
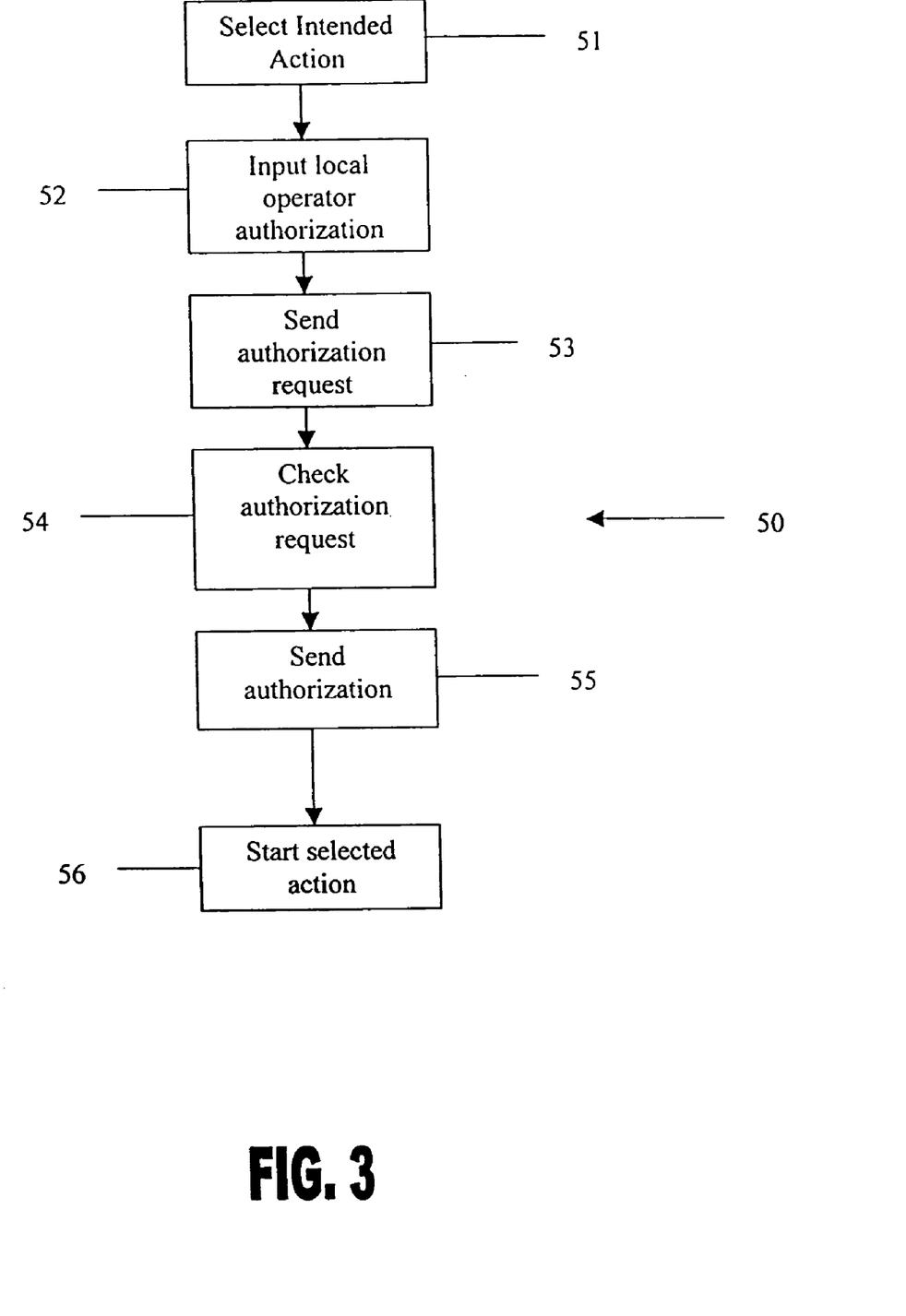
FIG. 3 is a block diagram of the operator authorization feature of the invention.

FIG. 3 illustrates the operator authorization process 50. At block 51, the operator selects the intended action using the PC 26, and at block 52, the operator inputs a personal identification number and, if utilized, biometric data. The control unit 18 then sends an authorization request to the central agency 24 at block 53, which checks the information in the authorization request against centrally stored data at block 54. Provided no discrepancies in the information exist, the central agency 24 sends back authorization for the intended action at block 55. If a discrepancy exists, the selected action is not authorized and the machine is prevented from performing the action. Once authorization is received, the control unit 18 starts the selected action at block 56. This process is repeated for each action that is requested of the machine by the operator.

Data Set Authorization

The table top machine 12 not only works under local operator control, but it also performs personalization based upon locally collected data, such as data input via the PC 26. To provide the central agency 24 with full control of the data that is being entered onto the documents and control of persons receiving personalized documents, every data set sought to be entered onto a document must first be authorized by the central agency. This facilitates detection of criminals and unauthorized persons attempting to receive documents.

Figure 4:
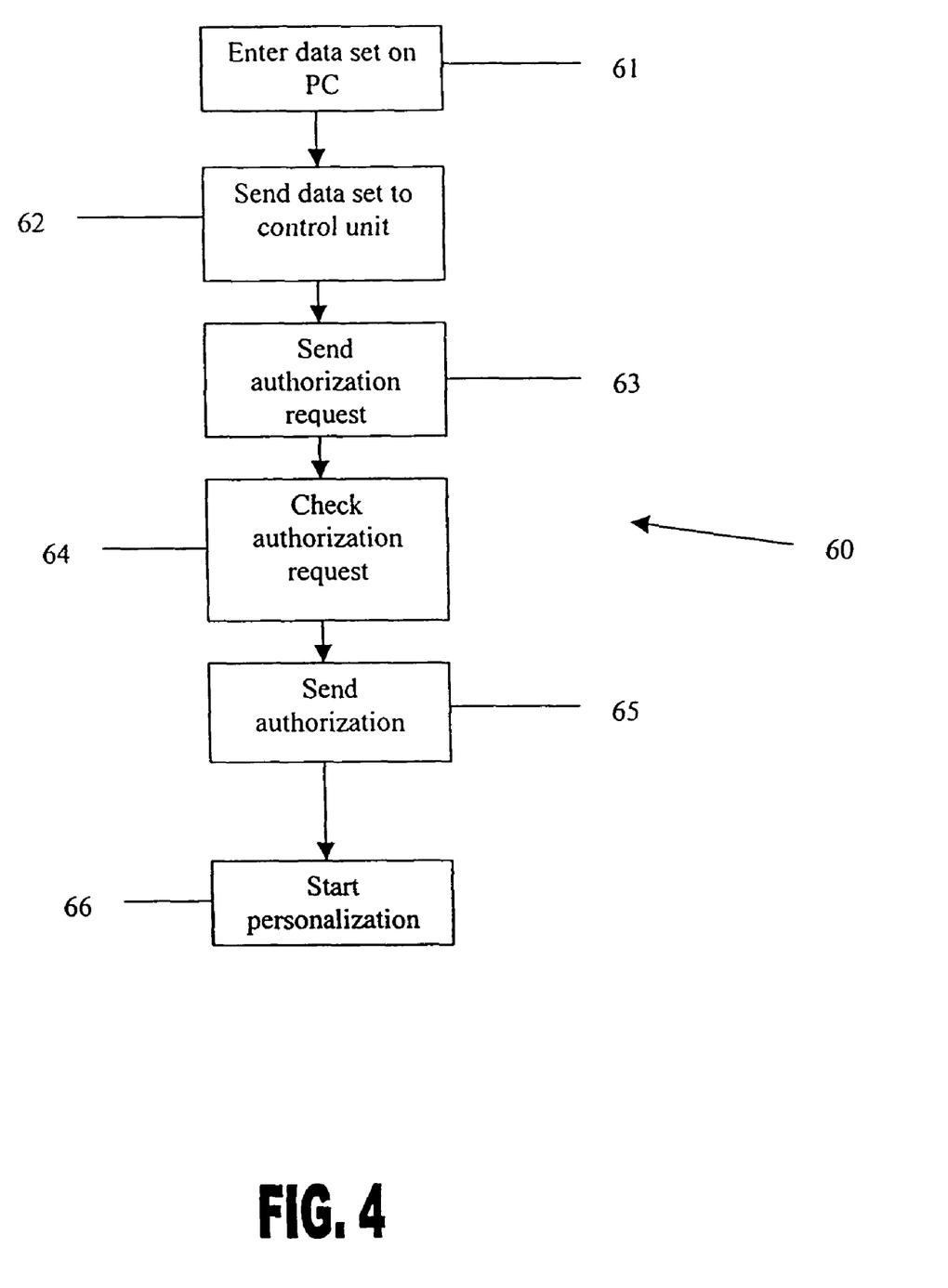
FIG. 4 is a block diagram of the data set authorization feature of the invention.

FIG. 4 illustrates the data set authorization process 60. At block 61, a data set that is to be personalized onto the document is entered by the operator of the PC 26. This data set is sent to the control unit at block 62, which then sends, at block 63, an authorization request to the central agency. The authorization request includes the data set, machine location information, operator ID and machine serial number, as well as biometric data if utilized. At block 64, the authorization request is checked against centrally stored data, and thereafter, assuming that no discrepancies exist, the central agency 24 sends back an authorization to the control unit 18 at block 65. If a discrepancy exists, the machine is prevented from personalizing the document with the selected data set. Once authorization is received, the control unit starts the personalization of the document with the data set at block 66.

Machine Operations Logging

As further added security, the system 10 also provides the central agency 24 with full control of mobile operations by logging all machine operations with the central agency.

Figure 5:
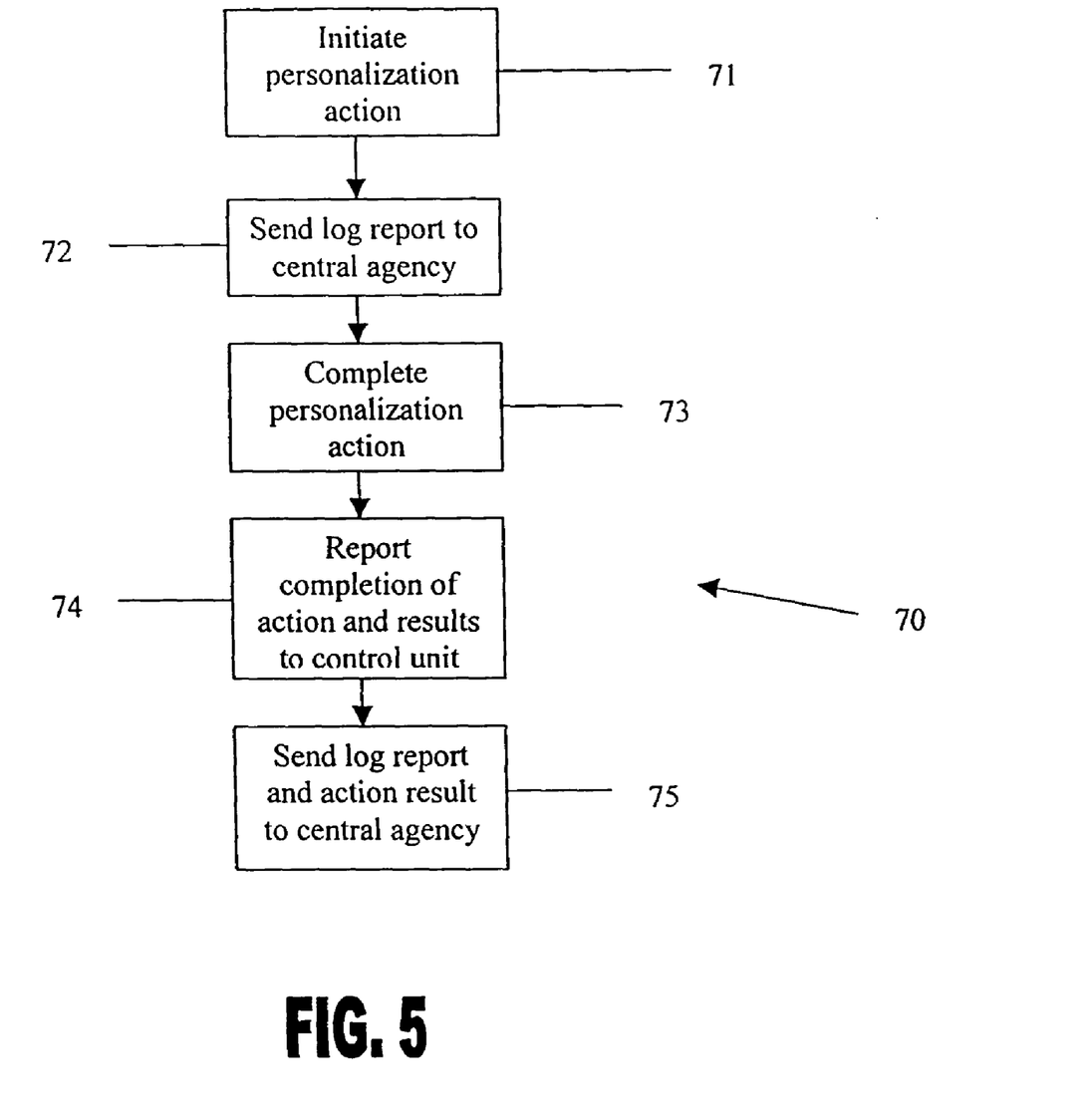
FIG. 5 is a block diagram of the machine operations logging feature of the invention.

FIG. 5 illustrates the machine operations logging procedure 70. At block 71, the control unit 18 initiates a personalization action of the personalization unit 16. The control unit 18 then sends a log report to the central agency at block 72. The control unit then waits for completion of the personalization action, block 73, and a report from the personalization unit 16, block 74, that the action is complete and the result of the action. The control unit 18 then sends another log report including the action result to the central agency 24 at block 75.

If the central agency 24 spots any impropriety in the log reports and action results, it can suspend operation of the machine 12 to allow investigation into the impropriety.

Document Logging

The system 10 also provides the central agency 24 with full control of the personalized documents, whereby every personalized document is logged with the central agency for tracking purposes.

Figure 6:
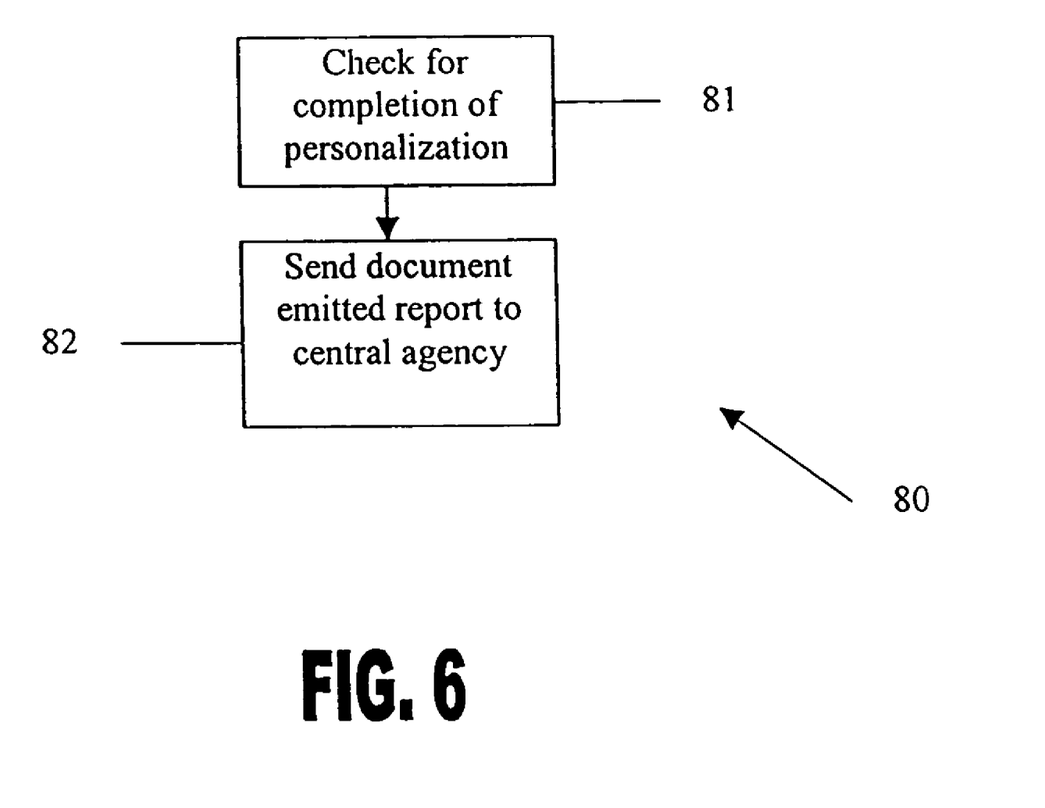
FIG. 6 is a block diagram of the document logging feature of the invention.

FIG. 6 illustrates the document logging process 80. At block 81, the control unit 18 checks for completion of the document personalization process. After the machine completes a personalization action on a document, the document is emitted from the machine to the operator or the intended user of the document. The control unit then sends a document emitted report to the central agency at block 82, which collects the report. In this manner, the central agency knows that a document has been produced for a user.

The system environment for all machines 12 described herein is generally the same, including at least one personalization unit 16, a control unit 18, GPS capability, GSM capability, encryption capability, and optionally operator biometrics capability.

The above specification, examples and date provide a complete description of the invention. Many embodiments of the invention, not explicitly described herein, can be made without departing from the spirit and scope of the invention.

What is claimed is:

1. A system for remote personalization and issuance of identity documents, comprising:
   a portable personalization machine having a housing that includes therein:
   i) at least one personalization unit for performing a personalization operation on an identity document,
   ii) an identity document input for inputting an identity document to be personalized,
   iii) an identity document output for outputting an identity document personalized by the personalization unit,
   iv) a control unit controlling the personalization unit,
   v) communications equipment comprising communications transceiver to permit communications between the control unit and a controlling authority remote from the personalization machine, and
   vi) an interface to permit connection between the control unit and a local controller;
   vii) a receiver for obtaining the current geographic location of the portable personalization machine;
   wherein the local controller permits entry of locally collected data to the portable personalization machine, the local controller being external to the portable personalization machine and being interfaceable with the interface of the personalization machine.

2. The system of claim 1, wherein the personalization machine further includes an encryption unit for encrypting and decrypting communications between the communications equipment of the personalization machine and the controlling authority.

3. The system of claim 1, wherein the receiver obtains the current geographic location of the personalization machine using a global positioning system.

4. The system of claim 1, wherein the communications transceiver comprises a global system for mobile communications transceiver.

5. The system of claim 1, wherein the interface comprises an Ethernet connection.

6. The system of claim 1, wherein the personalization unit comprises a laser engraving unit, an ink-jet printer, or an integrated circuit chip programming unit.

7. The system of claim 1, wherein the personalization unit is adapted to personalize cards or booklets.

8. A portable personalization machine for use in remote personalization and issuance of identity documents, comprising:
   a machine housing that includes integrated therein:
   at least one personalization unit for performing a personalization operation on an identity document;
   an identity document input for inputting an identity document to be personalized by the personalization unit;
   an identity document output for outputting an identity document personalized by the personalization unit;
   a control unit controlling the personalization unit;
   communications equipment comprising a communications transceiver to permit communications between the control unit and a controlling authority remote from the personalization machine;
   an interface to permit connection between the control unit and a local controller; and
   a receiver for obtaining the current geographic location of the personalization machine;
   wherein the local controller is provided externally to the personalization machine and allows entering of locally collected data to the portable personalization machine.

9. The portable personalization machine of claim 8, further including an encryption unit for encrypting and decrypting communications.

10. The portable personalization machine of claim 8, wherein the receiver obtains the current geographic location of the personalization machine using a global positioning system.

11. The portable personalization machine of claim 8, wherein the communications transceiver comprises a global system for mobile communications transceiver.

12. The portable personalization machine of claim 8, wherein the interface comprises an ethernet connection.

13. The portable personalization machine of claim 8, wherein the personalization unit comprises a laser engraving unit, an ink-jet printer, or an integrated circuit chip programming unit.

14. The portable personalization machine of claim 8, wherein the personalization unit is adapted to personalize cards or booklets.

15. A method of controlling a portable personalization machine for remotely personalizing and issuing identity documents, the portable personalization machine including at least one personalization unit capable of personalizing an identity document, comprising:
   inputting local operator authorization into the personalization machine via a local controller that is external to the portable personalization machine and that is interfaceable with the personalization machine, wherein the personalization unit is initially disabled so that the personalization unit cannot perform a personalization function on an identity document; and
   sending an enable request from the personalization machine to a controlling authority located remote from the personalization machine, wherein the enable request comprises information on the current geographic location of the personalization machine provided by a position receiver located in the personalization machine;
   wherein receiving of the local operator authorization into the personalization machine and sending the enable request to the controlling authority are controlled by a control unit integrated within the personalization machine.

16. The method of claim 15, further comprising checking the information in the enable request against information stored at the controlling authority.

17. The method of claim 16, further comprising sending an enable signal from the controlling authority to the personalization machine if the enable request information matches the stored information at the controlling authority, wherein the enable signal enables operation of the personalization unit so that the personalization unit can perform a personalization function.

18. The method of claim 15, further comprising inputting local operator authorization and sending an enable request to the controlling authority for each operation of the personalization unit that requires operator intervention.

19. The method of claim 15, further comprising inputting data to be personalized by the personalization unit into the personalization machine, sending the data to be personalized to the controlling authority, checking the data to be personalized against stored data at the controlling authority, and if there is a match, sending an authorization signal from the controlling authority to the personalization machine to enable the personalization unit to personalize the data onto the identity document.

20. The method of claim 17, further comprising sending a report to the controlling authority after the completion of each personalization action by the personalization unit.

21. The method of claim 20, further comprising sending a report to the controlling authority after the completion of personalization on an identity document.

* * * * *